United States Patent [19]

Ichimura et al.

[11] Patent Number: 5,168,610

[45] Date of Patent: Dec. 8, 1992

[54] COMPLEX MACHINE TOOL

[75] Inventors: Masaaki Ichimura; Hiroaki Tamaki; Hitoshi Sawamura, all of Ishikawa, Japan

[73] Assignee: Kabushiki Kaisha Komatsu Seisakusho, Tokyo, Japan

[21] Appl. No.: 793,349

[22] PCT Filed: May 14, 1991

[86] PCT No.: PCT/JP91/00635

§ 371 Date: Jan. 10, 1992

§ 102(e) Date: Jan. 10, 1992

[87] PCT Pub. No.: WO91/17846

PCT Pub. Date: Nov. 28, 1991

[30] Foreign Application Priority Data

May 14, 1990 [JP] Japan ................... 2-121268

[51] Int. Cl.$^5$ ............... B23P 23/04; B23K 26/00; B26D 5/02

[52] U.S. Cl. .................... 29/33 J; 83/552; 219/121.67; 266/65

[58] Field of Search ........... 29/33 R, 568, 33 J, 29/564; 83/409, 552, 682, 667; 219/121.82, 121.58, 121.67, 121.71, 121.84, 121.7; 266/77, 65, 160, 48

[56] References Cited

U.S. PATENT DOCUMENTS

| Re. 31,042 | 9/1982 | Clark et al. | 219/121.84 X |
|---|---|---|---|
| 4,063,059 | 12/1977 | Brolund et al. | 219/121.58 X |
| 4,165,667 | 8/1979 | Brolund et al. | 83/409 |
| 4,201,905 | 5/1980 | Clark et al. | 219/121.82 |
| 4,698,480 | 10/1987 | Klingel | 29/33 J X |
| 4,950,861 | 8/1990 | Erlenmaier | 219/121.67 |
| 4,976,180 | 12/1990 | Otto | 83/552 X |
| 5,008,510 | 4/1991 | Koseki | 219/121.7 |

FOREIGN PATENT DOCUMENTS

| 54-78586 | 6/1979 | Japan . | |
| 54-150188 | 10/1979 | Japan . | |
| 61-259844 | 11/1986 | Japan . | |
| 281833 | 11/1989 | Japan | 219/121.67 |
| 2056897 | 3/1981 | United Kingdom | 219/121.67 |

Primary Examiner—William Briggs
Attorney, Agent, or Firm—Armstrong & Kubovcik

[57] ABSTRACT

The present invention provides a complex machine tool wherein the punching center is coincides with the cutting work position so that the range of movement of a workpiece is not subjected to any restriction even during the workpiece cutting work in the same manner as in the workpiece punching work. The composite machine tool comprises a plasma torch (16) mounted on the machine tool body near the working position and arranged to be movable freely such that it can be withdrawn from the working position when a workpiece (5) is subjected to die-punching work, and proceeded to the working position when the workpiece is subjected to cutting work. Futher, the machine tool comprises protecting means (18, 19) for protecting the lower turret (3) and other members mounted adjacent thereto from the dross and heat developed by plasma arc during the workpiece cutting work by the plasma torch.

4 Claims, 5 Drawing Sheets

COMPLEX MACHINE TOOL

TECHNICAL FIELD OF THE INVENTION

This invention relates to a composite machine tool wherein a workpiece can be subjected to die-punching, cutting, boring or tapping work by one set thereof.

BACKGROUND OF THE INVENTION

A turret puch press has heretofore been used to punch a plate-shaped workpiece.

Further, laser working units or plasma working units are used to cut plate-shaped workpieces, and also complex machine tools comprising a turret punch press having a plasma torch mounted thereon have already been put to practical use.

In the above-mentioned complex machine tools, upon mounting the plasma torch on the turret punch press, to prevent the turret of the turret punch press from interfering with the plasma torch, a center "b" which is a plasma torch applying position is out of place from a punching center "a" which is a turret punch press applying position, as shown in FIG. 7.

In case the plasma machining tool is mounted on the turret puch press in the conventional complex machine tool, since the movement of a movable table adapted to hold a workpiece thereon is controlled on the basis of the punching centre, the range of movement of the workpiece is limited relative to the plasma torch mounted so as to conduct working at the position "b" which is out of place from the punching center "a" so that small-sized turret punch presses have been disadvantageous in that it is difficult to mount a plasma torch thereon.

SUMMARY OF THE INVENTION

The present invention has been contemplated in view of the above-mentioned circumstances, and has for its object to provide a complex machine tool wherein the punching center is coincident with the cutting work position so that the movable range of a workpiece is not limited even during the cutting work.

Another ojbect of the present invention is to provide a complex machine tool provided with a protecting means for preventing the dross and the heat developed by the plasma arc from giving ill effect on the turret and the members mounted adjacent thereto during the workpiece cutting work using the plasma torch.

To achieve the above-mentioned objects, according to a principal aspect of the present invention, there is provided a complex machine tool comprising: a substantially c-shaped frame forming the machine tool body, circular disc-shaped upper and lower turrets mounted on the upper and lower sides, respectively, of the frame in opposed relationship with each other and adapted to be rotated in synchronism with each other by an indexing motor, a plurality of pairs of punches and dice mounted on the upper and lower turrets, respectively, at regular intervals along the circumference thereof, and a striker means mounted on the frame above a predetermined fixed working position, whereby a workpiece is subjected to die-punching work between a pair of punch and die which is selected from among the pairs of punches and dice and indexed to the working position by the indexing motor, characterized by further comprising a plasma torch mounted on the machine tool body near the working position and arranged to be movable freely such that it can be withdrawn from the working position when the workpiece is subjected to die-punching work, and proceeded to the working position when the workpiece is subjected to cutting work.

According to a second aspect of the present invention, there is provided a complex machine tool as set forth in the above-mentioned main aspect, characterized by further comprising a protecting means for protecting the upper turret and members adjacent to the working position from the dross and the heat developed by plasma arc during the workpiece cutting work by the plasma torch.

According to a third aspect of the present invention, there is provided a complex machine tool as set forth in the above-mentioned third aspect, characterized in that the protecting means is comprised of a protection plate mounted on the lower turret and having a tapered through-hole formed therein at a location corresponding to the working position and which increases gradually in diameter downwards, and a thermal insulating cylinder having an outside diameter nearly equal to the diameter of the sliding surface of the lower turret and adapted to be moved up and down by a driving means.

Further, according to a fourth aspect of the present invention, there is provided a complex machine tool as set forth in the above-mentioned main aspect, characterized in that, in place of the plasma torch, a boring unit, a tapping unit, or a laser working head can be mounted at the plasma torch mounting position.

Thus, according to the present invention, since the workpiece cutting work by means of the plasma torch can be conducted at the workpiece punching position (punching center), movement of the workpiece to be cut can be made on the basis of the punching position which is set as the reference position so that the range of movement of the workpiece is not subjected to any restriction.

Further, adverse effect of the heat and dross can be eliminated by shilding the turret with the protecting means during workpiece cutting work, and also by mounting any other working unit in place of the plasma torch a workpiece can be subjected to other working than the die-punching and cutting work.

The above-mentioned and other objects, aspects and advantages of the present invention will become apparent to those skilled in the art by making reference to the following detailed description and the accompanying drawings in which preferred embodiments incorporating the principles of the present invention are shown by way of example only.

DETAILED DESCRIPTION OF PREFERRED EMBODIMENTS

The present invention will now be described in detail below by way of a preferred embodiment thereof with reference to the accompanying drawings. (FIGS. 1 to 6)

Figure 1:
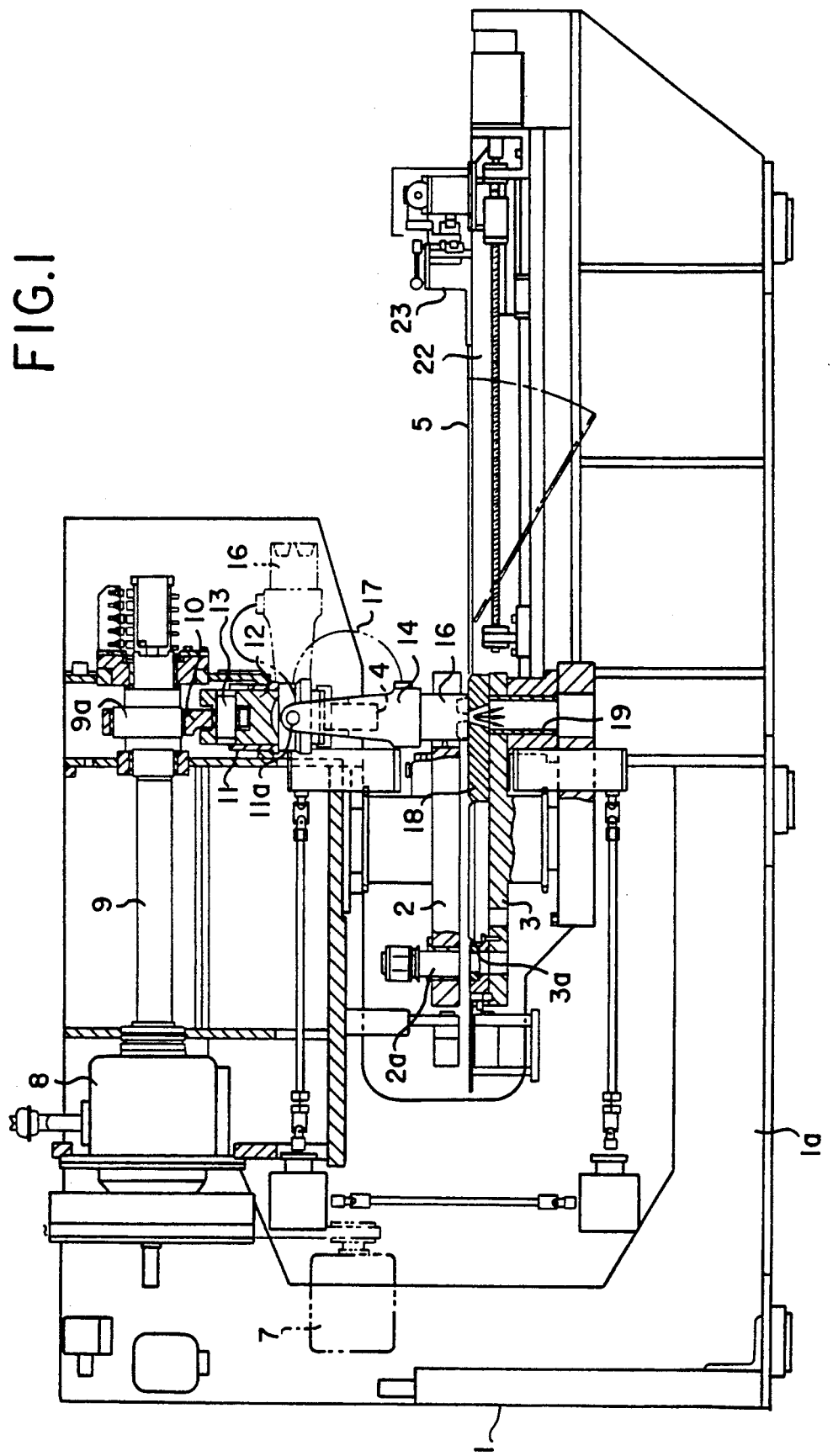
FIG. 1 is a partially cut-away, schematic overall side elevational view showing one embodiment of the present invention.
Figure 2:
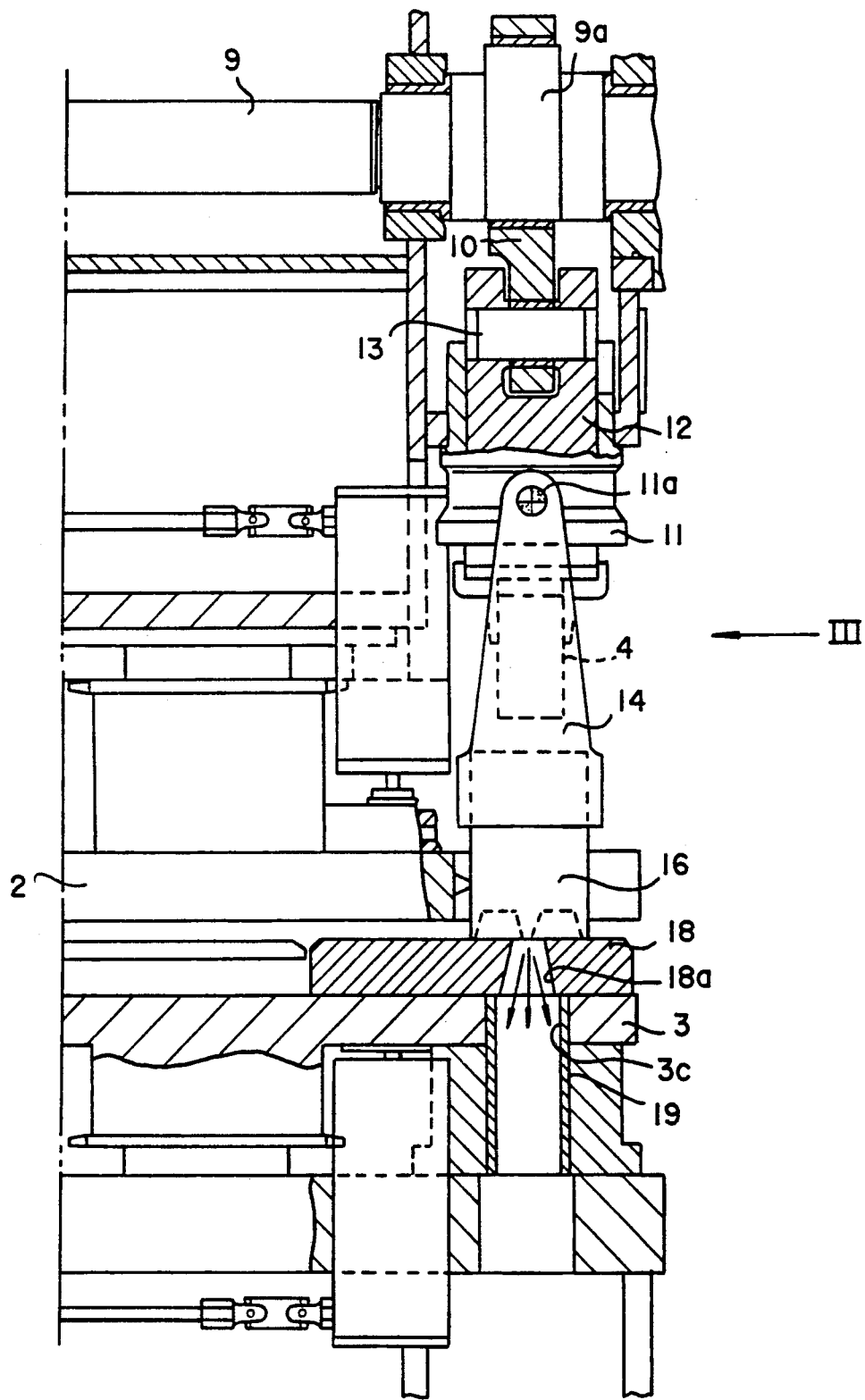
FIG. 2 is a partially cut-away, enlarged side elevational view of principal parts of the embodiment shown in FIG. 1.
Figure 3:
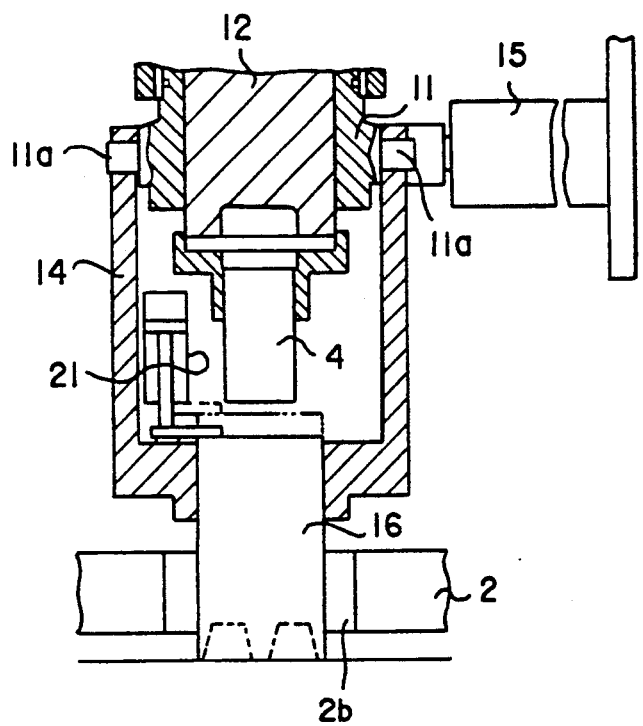
FIG. 3 is a sectional view looking in the direction shown by arrow III in FIG. 2.

In FIG. 1, reference numeral 1 denotes a complex machine tool body having an upper-turret 2 and a lower turret 3 mounted on the upper and lower sides, respectively, of a substantially c-shaped frame 1a in opposed relationship with each other, these upper and lower turrets 2 and 3 being adapted to be rotated in synchronism with each other by an indexing motor, not shown.

Figure 4:
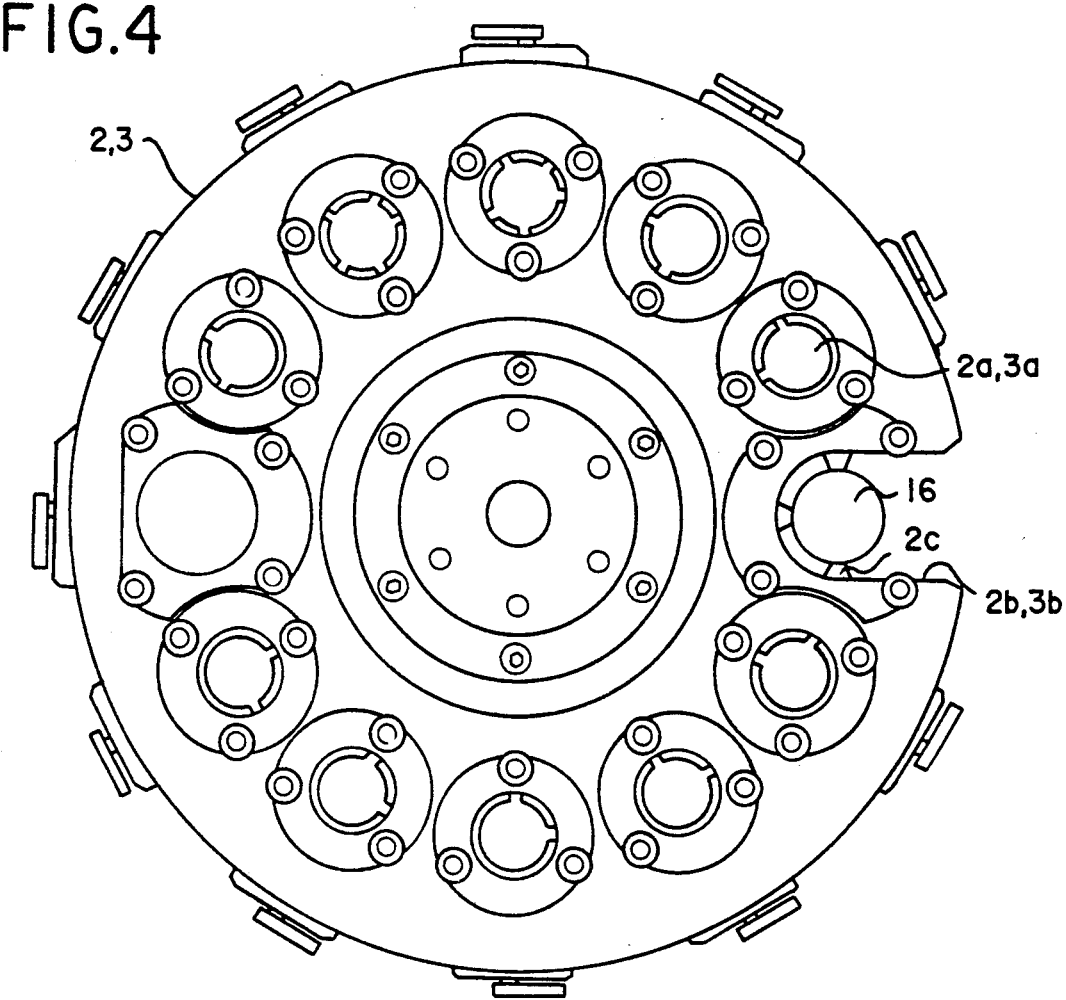
FIG. 4 is a plan view of a turret.
Figure 5:
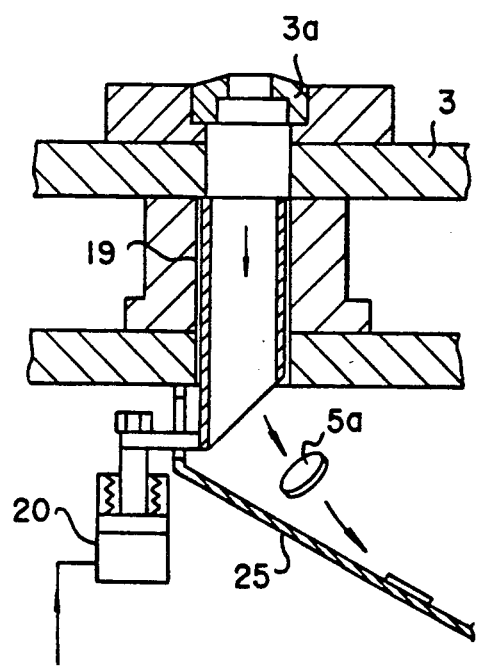
FIG. 5 is an explanatory view showing the punching operation of a workpiece.

The above-mentioned upper and lower turrets 2 and 3 have a plurality of pairs of punches 2a and dice 3a, respectively, mounted thereon at regular intervals along the circumference thereof. The arrangement is made such that, when a punch 2a which is selected from among the punches and indexed to a working position is struck by a striker 4, a plate-shaped workpiece 5 is subjected to die-punching between the punch 2a and a die 3a associated therewith. The upper turret 2 and the lower turret 3 are formed with notches 2b and 3b, respectively, as shown in FIG. 4. These notches 2b and 3b are indexed to a working position when the workpiece is subjected to cutting work. Further, mounted on the upper part of the above-mentioned frame 1a is a horizontally extending drive shaft 9 adapted to be rotatively driven by a drive motor 7 through the intermediary of a clutch brake 8. The drive shaft 9 has an eccentric cam 9a formed on the portion thereof above the working position. The upper end of a connecting rod 10 is journaled by the eccentric cam 8a.

The lower end of the above-mentioned connecting rod 10 is pivotally connected through the intermediary of a pin 13 to a plunger 12 supported by a holder 11 so as to be slidably moved up and down freely, and a striker 4 is attached to the lower end of the above-mentioned plunger 12 so that with the rotation of the drive shaft 9 the striker 4 can strike down the punch 2a which is stopped at the working position.

Whilst, the above-mentioned holder 11 has support shaft 11a which passes through the outer peripheral surface thereof, and the upper ends of a yoke 14 are journaled by the support shaft 11a.

The above-mentioned yoke 14 is arranged so that the lower end thereof can be turned by a plasma torch turning unit 15, which consists of an air torque motor and an air cylinder, by approximately 90 degrees about the support shaft 11a. Further, the above-mentioned yoke 14 has a plasma torch 16 mounted on the lower part thereof so that it can be moved up and down by a lift cylinder 21.

The above-mentioned plasma torch 16 is connected to the side of the complex machine tool body together with pipings and wirings 17 such as plasma gas and cooling water supply conduits, power and signal supply cables, etc.

Further, a plate-shaped member denoted by reference numeral 18 and mounted above the lower turret 3 is a protection plate for preventing dross or the like which generates during working of a workpiece by the plasma torch 16, from depositing on the sliding surface 3c of the lower turret 3. The protection plate 18 is made of a heat insulating material and has a tapered through-hole 18a formed in the portion thereof corresponding to the working position and which increases in diameter downwards.

Further, reference numeral 19 denotes a thermal insulating cylinder for protecting the lower turret 3, the sliding surface 3c thereof and the other adjacent members from the heat developed by the plasma arc. The thermal insulating cylinder 19 has the same diameter as the sliding surface 3c and is arranged such that it can be moved by the action of an air cylinder 20 up and down along the sliding surface 3c of the lower turret 3.

In the next place, the operation of the composite machine tool according to the present invention will be described below. In case the workpiece 5 is subjected to die-punching work between the punch 2a mounted on the upper turret 2 and the die 3a mounted on the lower turret 3a, the thermal insulating cylinder 19 is lowered by the action of the air cylinder 20 to the position shown in FIG. 5, and under this condition the upper turret 2 and the lower turret 3 are rotated in synchronism with each other so as to index a punch 2a and a die 3a to be put to use to the working position.

Further, the yoke 14 is turned by the plasma torch turning unit 15 about the support shaft 11a to the position shown by imaginary line in FIG. 1 to thereby withdraw the plasma torch 16 to a position where there is no interference between the plasma torch 16 and the striker 4.

And, in this condition, the workpiece 5 resting on an X Y table is clamped by means of a clamp 23 and moved in the direction shown by X and/or the direction shown by Y so as to allow the punching position to correspond with the working position, and then when the punch 2a is struck down by the striker 4 the workpiece 5 is subjected to die-punching work between the punch 2a and the die 3a.

After that, by moving the workpiece 5 and repeating the above-mentioned operation, the workpiece 5 can be subjected to die-punching work continuously, and circular pieces 5a which are cut off by punching the workpiece 5 drop through the thermal insulating cylinder 19 onto a chute 25 and are discharged by the chute 25.

Whilst, in case it is desired to cut the workpiece 5 by the action of plasma arc, the upper turret 2 and the lower turret 3 are rotated in synchronism with each other until the cutting notches 2b and 3b of the upper turret 2 and the lower turret 3, respectively, reaches the working position. When the cutting notches 2b and 3b have been located at the working position, the protection plate 18 is attached to the notch 3b of the lower turret 3, and then the thermal insulating cylinder 19 is raised by the action of the air cylinder 20 to the position shown in FIG. 2, thereby protecting the lower turret 3 and the other adjacent members from the heat developed by the plasma arc.

In the next place, the yoke 14 is rotated by the means of the plasma torch turning unit 15 until the outer peripheral surface of the plasma torch 16 is brought into contact with positioning blocks 2c provided on the notch 2b, and then the plasma torch 16 is lowered to the working position shown in FIG. 1 so as to allow a spoon-shaped profiling plate 16a attached to the leading end of the plasma torch 16 to be brought into sliding contact with the upper surface of the workpiece 5.

Figure 6:
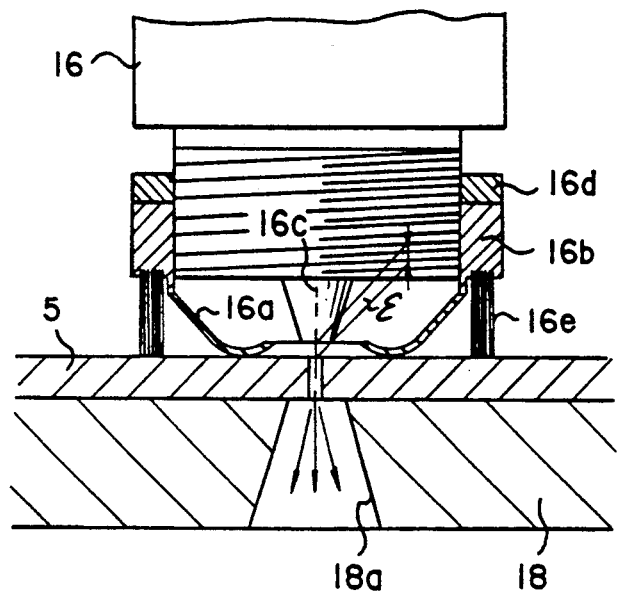
FIG. 6 is an enlarged sectional view of the leading end of a plasma torch.
Figure 7:
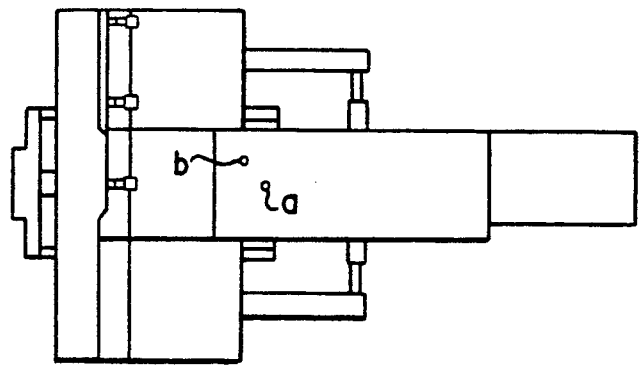
FIG. 7 is a schematic, plan view of the conventional example.

Further, the profiling plate 16 is attached to a nozzle height adjusting screw 16b as shown in FIG. 6. By rotatively adjusting this nozzle height adjusting screw 16b, the optimum distance e for cutting between the nozzle 16c and the workpiece 5 can be set, and after setting the distance ε, the nozzle height adjusting screw 16b is fixedly secured by means of a lock nut 16d.

Further, the nozzle height adjusting screw 16b has a heat-resisting brush 16e made of glass fibre implanted on the lower surface thereof so as to surround the profiling plate 16a to prevent the sputter, which generates during the cutting work, from scattering to the surrounding.

Whilst, when the preparations for plasma cutting have been made as described above, cutting work of the workpiece 5 can be conducted by moving the workpiece 5 on the X Y table 22 while plasma arc is developed by the plasma torch 16.

Further, since even during the cutting work by plasma arc the workpiece 5 can be moved in the same manner as in the case of workpiece punching operation, the range of cutting of the workpiece is not subjected to any restriction.

Moreover, by mounting a boring unit, a tapping unit, a marking unit, or a laser machining head on the york 16 in place of the plasma torch 16, the workpiece 5 can be subjected to boring work, tapping work, marking work or laser cutting work.

While in the above-mentioned embodiments the arrangement is made such that the plasma torch 16 is withdrawn by turning the yoke 14, other methods, such as for example, a method of sliding the plasma torch 16 towards the centers of the turrets 2 and 3 can also be used.

We claim:

1. A complex machine tool comprising a substantially c-shaped frame forming the machine tool body, circular disc-shaped upper and lower turrets mounted on the upper and lower sides, respectively, of the frame in opposed relationship with each other and adapted to be rotated in synchronism with each other by an indexing motor, a plurality of pairs of punches and mounted on the upper and lower turrets, respectively, at regular intervals along the circumference thereof, and a striker means mounted on said frame above a predetermined fixed working position, whereby a workpiece is subjected to die-punching work between a pair of punch and die which is selected from among the pairs of punches and dice and indexed to said working position by said indexing motor, said upper and lower turret having notches juxtaposable with said working position, plasma torch pivotably mounted on the machine body near said working position, and arranged to be movable freely such that it can be withdrawn from the working position when the workpiece is subjected to die-punching work, and proceeded to said working position in said notches when the workpiece is subjected to cutting work.

2. A complex machine tool as claimed in claim 1, characterized by further comprising a protecting means for protecting the lower turret and other structure adjacent to said working position from the dross and the heat developed by the plasma arc during the workpiece cutting work by the said plasma torch.

3. A complex machine tool as claimed in claim 2, characterized in that said protecting means is comprised of a protection plate mounted on said lower turret and having a tapered through-hole formed therein at a location corresponding to said working position and which increases gradually in diameter downwards, and a thermal insulating cylinder having an outside diameter nearly equal to the diameter of the sliding surface of the lower turret and adapted to be moved up and down by a driving means.

4. A complex machine tool as claimed in claim 1, characterized in that, in place of the plasma torch, a boring unit, a tapping unit, or a laser working head can be mounted at the plasma torch mounting position.

* * * * *